Figure 1:
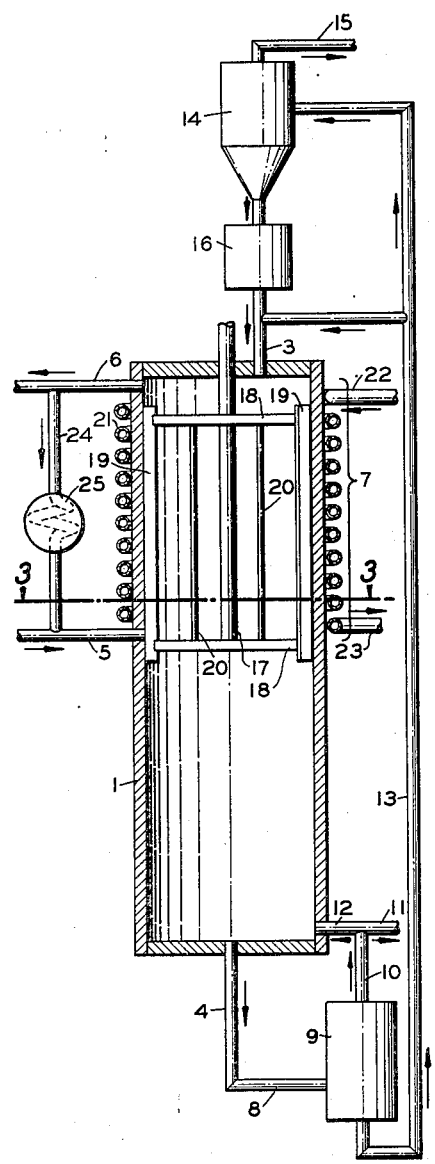

April 20, 1954    R. A. FINDLAY ET AL    2,676,167

SEPARATION PROCESS

Filed May 16, 1950

INVENTORS.
R. A. FINDLAY
J. A. WEEDMAN

BY Hudson & Young

ATTORNEYS

Patented Apr. 20, 1954

2,676,167

UNITED STATES PATENT OFFICE 2,676,167

SEPARATION PROCESS

Robert A. Findlay and John A. Weedman, Bartlesville, Okla., assignors to Phillips Petroleum Company, a corporation of Delaware Application May 16, 1950, Serial No. 162,307

16 Claims. (Cl. 260—96.5)

This invention relates to a process for the formation of adducts of urea or thiourea with adduct-forming organic compounds. In one of its aspects, this invention relates to a process for the separation of an adduct-forming compound from a non-adduct-forming compound. In another of its aspects, this invention relates to a process employing a moving bed of urea or thiourea for effecting a ready separation of such compounds.

There has recently been discovered a process for the preparation of adducts of urea or thiourea with certain adduct-forming compounds. Such a process has found ready application in the separation of hydrocarbons in accordance with their chain types by forming adducts selectively between the hydrocarbons and urea or thiourea. Thus, mixtures of a straight carbon atom chain hydrocarbon such as n-octane and a branched carbon atom chain hydrocarbon such as iso-octane can be separated into separate fractions of straight chain and branched chain hydrocarbons by treating such mixture with urea which forms a crystalline adduct with the straight chain hydrocarbon but not with the branched chain hydrocarbon or by treating the mixture with thiourea which forms a crystalline adduct with the branched chain hydrocarbon but not with the straight chain hydrocarbon. The resulting crystalline adduct can be readily separated from the remaining non-adduct-forming hydrocarbon and then decomposed by heating to a suitable decomposition temperature, usually from about 130 to 180° F., in order to liberate the adducted hydrocarbon. Although such a separation process, as set forth above, is known to the prior art, its use has been substantially limited to laboratory procedures and commercial adaptations of such process have not been developed.

It has now been found that an adduct can be formed between an adduct-forming compound and urea or thiourea, as the case may be, by passing the said compound countercurrently through a downwardly moving column or mass of crystalline urea or thiourea. It has also been found that an adduct-forming compound can be readily separated from its admixture with a non-adduct-forming compound by passing the admixture countercurrently through a moving bed or column or mass of crystalline urea or thiourea. It has been further found that as such an adduct is formed, the crystals of urea or thiourea grow in size as they are converted to the adduct so that their passage downwardly as a moving column through a vessel is hindered due to this increase in size and as a result there is a tendency for the urea and thiourea, which, as stated, has become adducted with the adduct-forming compound to form adduct particles, to bridge across and to plug the vessel containing the moving bed and thereby stop the crystalline mass from flowing therethrough. In an effort to overcome the effects of such increase in size and of the bridging and clogging tendencies of the adduct particles, it has been found that if the moving bed of crystalline material is agitated and if sufficient non-adduct-forming compound is flowing countercurrently through the moving bed, then the crystalline adduct particles will flow freely through a vessel as a downwardly moving column and will not clog the vessel by bridging across it. In some cases where the crystalline adduct is of sufficient hardness to withstand considerable agitation, mechanical agitation such as a revolving stirrer, can be used to overcome the above-described bridging and clogging tendencies of the adduct particles. However, in most cases, the crystalline adduct particles are soft and rather fluffy so that extensive agitation thereof would result in undue attrition of the crystalline adduct particles with the result that the moving column of material would degenerate into a mass of fines which are not suitable for such type of operation. According to this invention, there is provided an additional or even a sole agitation means which is capable of preventing the adduct particles as they are formed from bridging across and plugging the vessel containing them as a downwardly moving column and yet which does not result in undue attrition of such particles into fines as would excessive mechanical stirring. Such additional agitation is secured by passing a liquid non-adduct-forming compound upwardly and countercurrently to the downwardly moving mass of urea or thiourea and the adduct particles which they form. In this manner, such non-adduct-forming compound acts as a hydraulic agitation means to provide the desired, gentle agitation of the adduct particles and also provides a fluid film between the individual particles of adduct which prevents their bridging up into an unmoveable mass. The liquid non-adduct-forming compound can be that which is present in the feed to the process as one of the components to be separated from an adduct-forming compound also contained in the feed but in a preferred embodiment, it is a liquid, such as methyl ethyl ketone, which will form a non-ideal solution with the adduct-forming compound to thereby dilute the feed containing the adduct-forming compound without decreasing the activity of such compounds with respect to their ability to form adducts with urea or thiourea. Reaction rates are, therefore, not decreased by the presence of such a diluent. Thus, according to one of the embodiments of this invention, a moving bed of urea or thiourea can be passed downwardly through a vessel and the mixture to be separated can be introduced at an intermediate point thereof. The non-adduct compound can be removed from the upper portion of the vessel and the adduct of the urea or thiourea and the adduct-forming compound can be removed at the bottom thereof. The portion of the moving column of urea or thiourea above the point of introduction of the feed mixture to be separated will especially display a tendency for the crystalline adduct to bridge across and thereby plug the vessel through which the urea or thiourea column is moving. Also, although to a lesser degree, the portion of the moving column of crystalline material below the point at which the feed is introduced will likewise have a tendency to bridge and plug. However, this portion of the column will usually remain free flowing when the upper portion of the column, i. e., that above the point of feed introduction, is maintained in a flowable condition. Accordingly, the portion of the adduct-forming zone above the point of feed introduction is agitated to a suitable extent by any one of well known mechanical agitation means such as a slowly moving stirrer. In addition, there is maintained in this zone a relatively high proportion of the non-adduct-forming compound to provide, as stated, a hydraulic agitition of the individual adduct particles.

Addition of an inert non-adsorbent, inorganic solid material, preferably ceramic in nature, such as alumina, silica or bauxite, reduced to a particle size within the range of 6 to 100, preferably 12 to 20, mesh, to the crystalline urea or thiourea will also decrease the tendency of the latter to bridge. The amount of such material added can be from 0.1 to 2.0, preferably from 0.2 to 1.0, pounds per pound of urea or thiourea. Such addition can be employed in conjunction with the agitation means described herein.

As stated, the adduct is removed from the lower portion of the vessel containing the moving bed of crystalline materials. In order to cause the necessary amount of non-adduct-forming compound to flow through the upper portion of the moving bed of crystalline material to act as a hydraulic agitation means therein and yet to obtain the desired degree of separation between the adduct-forming and the non-adduct-forming compounds, it has been found necessary to provide the lower portion of the moving bed with a reflux of the adducted compound in order to prevent the non-adduct-forming compound, which is present in substantial excess in the upper portion of the moving bed, from being withdrawn from the lower portion of the moving bed in admixture with the desired adduct. When employing such reflux, a very sharp separation can be made between the adduct-forming compound and the non-adduct-forming compound while concomitantly preventing bridging over and plugging of the upper portion of the moving bed of crystalline material. Still further, it has been found that it is often desirable to provide a cooling means for the upper portion of the moving bed of crystalline material to facilitate the formation of the desired adduct in the cooled portion of the moving bed. In such instance, it has been found that the required amount of reflux can be provided to the lower portion of the moving bed of crystalline material by providing a heating and adduct decomposition zone at the lower portion thereof. When operating in such manner, the adduct-forming compound liberated in the decomposition zone acts to provide an internal reflux of the moving bed.

It is an object of this invention to provide a process for preparing an adduct of urea or thiourea with an adduct-forming organic compound wherein the said adduct is formed by contacting the adduct-forming compound with a moving bed of urea or thiourea in such a fashion that said adduct is formed without causing a bridging over and clogging of said moving bed.

It is another object of this invention to provide a process for separating an adduct-forming organic compound from admixture with a non-adduct-forming compound by contacting said admixture with a downwardly moving column or mass or bed of urea or thiourea in such a manner that the moving mass does not clog the apparatus containing such mass and at the same time achieve a high degree of separation between said compounds.

It is still another object of this invention to provide a process for separating an adduct-forming compound from admixture with a non-adduct-forming compound by contacting said admixture with a moving bed of urea or thiourea in such a manner that the said moving bed does not clog the apparatus containing the same and to provide an internal reflux in said moving bed in order to ensure a high degree of separation of said compounds.

Yet another object of this invention is to provide a method for agitating a downwardly moving column or mass or bed of crystalline urea or thiourea which is being converted into an adduct by reaction with an adduct-forming compound whereby the said urea or thiourea is prevented from bridging over and plugging an apparatus containing the same without causing undue attrition of the adduct particles formed in said bed.

Figure 2:
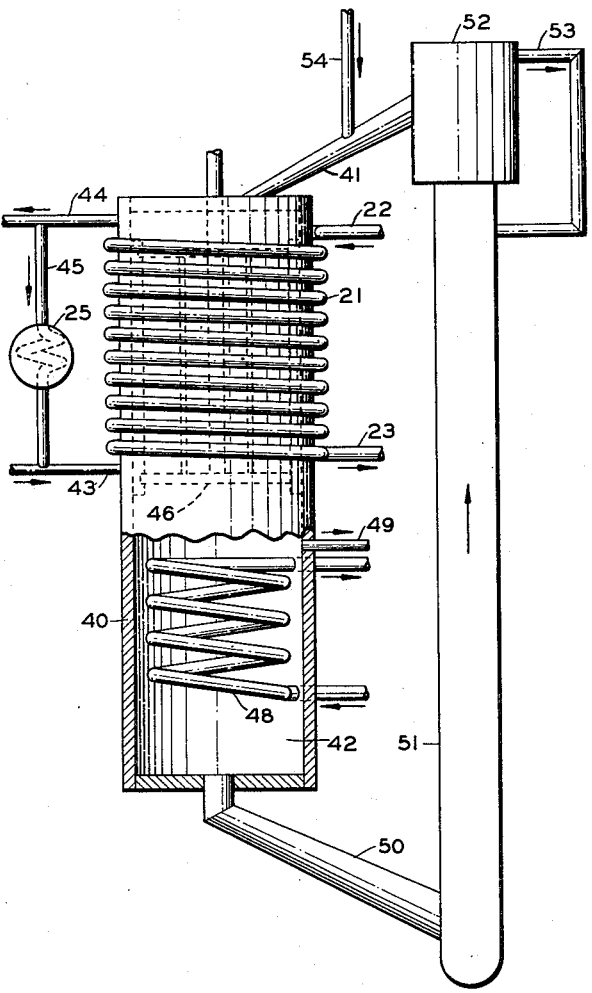
Figure 3:
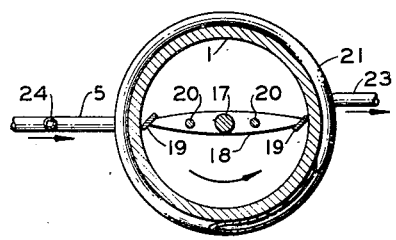

Various other objects, advantages and features of the invention will become apparent from the following detailed description taken in conjunction with the accompanying drawings, in which:

Figures 1 and 2 illustrate preferred embodiments of this invention employing suitable apparatus capable of accomplishing the purposes of the invention. Figure 3 is a cross section taken on the line 3—3 in Figure 1.

Referring to Figure 1, a separation column 1, the upper portion of which is an adduct-forming zone, is provided to contain a downwardly gravitating column or mass or bed of crystalline material. Urea or thiourea, as the case may be, enters the top of the column through line 3 and is removed therefrom through line 4. A feed material is introduced into the column through line 5 and can comprise a mixture of adduct-forming compounds and non-adduct-forming compounds as will be more fully described hereafter. The non-adduct-forming compound is removed from column 1 through line 6. Thus, the mixture of adduct-forming and non-adduct-forming compounds injected through line 5 tend to pass upwardly through the column and in so doing contact the moving bed of urea or thiourea in the upper portion 7 of column 1. The adduct-forming compound becomes adducted with the urea or thiourea to form a solid crystalline adduct and is carried along with the moving bed of urea or thiourea to the bottom portion of vessel 1. The non-adduct-forming compound passes upwardly through the bed and is removed, as stated, through line 6. The adduct removed through line 4 is passed through line 8 to a decomposition zone 9 wherein the adduct is decomposed to liberate the adduct-forming compound and urea or thiourea, as the case may be. The adduct in decomposition zone 9 can readily be decomposed by contacting it with from one to four volumes of water per volume of adduct. The water is preferably at a temperature within the range of 70° to 100° F. The adduct can also be decomposed by merely heating in the absence of added water to a temperature within the range of 125 to 200° F., preferably from 130 to 180° F. The released adduct-forming compound is withdrawn through line 10 and a portion thereof is sent through line 11 to storage or to further processing steps (not shown). The remaining portion of the adduct-forming compound is returned via line 12 to the lower portion of column 1 wherein it serves as reflux to drive the non-adduct-forming compound up the column so that it can be removed through line 6. The amount of reflux employed will depend largely upon the degree of separation desired between the adduct-forming and non-adduct-forming compounds and upon the relative proportions of adduct-forming and non-adduct-forming compounds present within column 1. Ordinarily, a reflux ratio of about one to six volumes, preferably about one to three volumes, of reflux for each volume of adduct-forming compound removed through line 11 is found to be satisfactory.

The urea or thiourea liberated in decomposition zone 9 is withdrawn through line 13 and passed therethrough to line 3 to again enter column 1. When dry heat is employed in decomposition zone 9 to decompose the adduct contained therein, the urea or thiourea passing through line 13 will ordinarily be in a crystalline state and can be used without further treatment the column 1. When hot water is employed in the decomposition zone 9, the urea or thiourea passing through line 13 will be in a form of a slurry or a solution depending upon the amount of water employed in zone 9. In such case, it is desirable to reconcentrate such solution or slurry in an evaporator 14 in a manner readily apparent to one skilled in the art. Excess water is withdrawn from evaporator 14 through line 15 and can be discarded. Crystalline urea from evaporator 14 can be centrifuged in centrifuge 16 to remove additional water therefrom before it is passed through line 3 to column 1. Since water is a substance which activates urea or thiourea to permit it to more readily form adducts in column 1, it is preferable that a minor proportion of water be permitted to remain in the urea or thiourea passing from centrifuge 16 into column 1. The amount of water employed should ordinarily be within the range of 0.5 to 14, preferably, from 5 to 8 per cent by weight of the urea or thiourea. Other activators such as the low boiling aliphatic alcohols, e. g. methanol and ethanol, and non-adduct-forming ketones and aldehydes can be added to the urea or thiourea passing through line 3 into column 1 either to augment the activating effect of the water or as the sole activator in the absence of water.

In accordance with one embodiment of this invention, there is provided a mechanical agitating means for the upper portion 7 of column 1 in order to prevent the adduct flowing therethrough from bridging across and clogging column 1. Such mechanical agitating means should provide a gentle agitation of the downwardly moving bed of crystalline material with neither a lifting nor a depressing action on the crystalline material in order to prevent undue attrition of the adduct particles which, as stated, tend to become soft and fluffy during the course of their preparation. It has been found that the mechanical agitating means should agitate the downwardly moving column of crystalline material without causing it to be lifted up or to be compacted as it flows downwardly in vessel 1. Thus, the mechanical agitation means should move the crystalline material laterally or sideways in column 1 without causing its normal downward movement to be either accelerated or decelerated as a result of mechanical agitation. In the drawing, there is illustrated a suitable mechanical agitation means comprising a vertical rotatable shaft 17 having cross arms 18 attached thereto. Scraper blades 19 are attached to cross arms 18 as shown and are adapted to scrape the walls of column 1 as shaft 17 is rotated. A flexible joint (not shown) can be provided between cross arms 18 and scraper blades 19. Vertical agitating rods 20 are attached to upper and lower cross arms 18 at a point intermediate the center and ends of the cross arms as shown. As shaft 17 is rotated by an external source of power (not shown), agitating rods 20 and scraper blades 19 cause the downwardly moving crystalline material to be agitated without causing it to be lifted up or packed down in column 1. In addition, scraper blades 19 free the walls of column 1 of any crystalline material which may adhere thereto.

In accordance with the preferred embodiment of this invention, the agitating means above-described is rotated at a rate such that it will only partially prevent bridging over of the crystalline mass in column 1 and the additional agitation necessary to prevent such bridging is provided in the form of a hydraulic agitation by up-flowing through column 1 non-adduct-forming compound from line 5. As stated, a mixture of adduct-forming and non-adduct forming compound is introduced into column 1 through line 5 and the non-adduct-forming compound is removed through line 6 in the top of column 1. The adduct-forming compound adducts with the thiourea or urea, as the case may be in the column 1. It is desirable to provide a substantial preponderance of the non-adduct-forming compound in the upper portion 7 of column 1 in order that it may hydraulically agitate the crystalline material passing downwardly through such zone. Ordinarily, the feedstock passing through line 5 will not contain sufficient of the non-adduct-forming compound to provide a sufficient volume thereof to insure adequate hydraulic agitation of the moving bed. Accordingly, there is provided a recycle line 24 in which at least a portion of the non-adduct-forming compound emerging from column 1 through line 6 can be returned to feed line 5 to provide sufficient volume of non-adduct-forming liquid therein such that the rate of flow of such liquid upwardly through column 1 will insure agitation of the crystalline material therein. The rate of flow of the non-adduct-forming compound which must be provided in column 1 will depend upon a number of factors, including the degree of agitation provided by the above-described mechanical agitation means, the rate of flow of the crystalline material downwardly through column 1, the amount of non-adduct-forming material in the feed to column 1 and the extent of agitation necessary to be provided to prevent bridging over of the crystalline material therein. While the optimum rate of flow of such non-adduct-forming compound in column 1 can best be determined by mere routine test in any specific apparatus and for any specific feed material, it has been found that adequate hydraulic agitation will be provided in column 1 when the space velocity of the non-adduct-forming compound therethrough is within the range of 2 to 30, preferably from 5 to 15 volumes of non-adduct-forming material per volume of urea or thiourea per hour. The space velocity of the adduct-forming compound (computed as a free and non-adducted liquid) should be within the range of 0.5 to 5 volumes per volume of urea or thiourea per hour. The rate of introduction of the adduct-forming compound into column 1 should be such that there will exist in said column a mol ratio of urea or thiourea to the adduct-forming compound within the range of 1:1 to 10:1.

Referring to Figure 2, there is shown an embodiment of the process of this invention wherein the reflux necessary to achieve a high degree of separation between the adduct-forming and the non-adduct-forming compounds is internally provided and wherein the moving column or mass or bed contains both an adduct-forming and an adduct decomposition zone. In the figure, a vessel 40 is adapted to receive crystalline urea or thiourea from line 41 and to conduct it downwardly by gravity as a column or mass 42. The feed mixture of adduct-forming and non-adduct forming compounds is introduced through line 43 at a point intermediate the ends of vessel 40. The feed tends to flow upwardly and countercurrently to the downwardly moving mass of urea or thiourea whereby the adduct-forming compound forms an adduct with the urea or thiourea and is carried downwardly with the moving bed. The non-adduct-forming compound is removed from vessel 40 through line 44 and a portion thereof can be returned to feed line 43 through line 45 to provide hydraulic agitation of the moving bed of crystalline material 42 above the point of introduction of feed through line 43. The amount of non-adduct-forming compound passed through line 45 is determined by the considerations mentioned above with respect to line 24 of Figure 1 and a like amount can be employed in Figure 2. A mechanical agitation means 46 is provided similar to that of Figure 1. Further, a cooling means such as cooling coil 21 is adapted to cool the portion of moving bed 42 above the point of feed introduction through line 43 to a temperature suitable for adduct-formation, preferably within the range of minus 70 to 120° F., preferably 0° to 100° F.

As the adduct formed in the upper portion of vessel 40 progresses downwardly as part of the moving bed, it will carry with it a portion of the non-adduct-forming compound which if not removed therefrom, will contaminate the adduct-forming compound product. In accordance with the embodiment of the invention shown in Figure 2, there is provided a decomposition zone in the lower portion of vessel 40. Thus, there is provided a heating means 48 such as a coil adapted to heat the adduct particles flowing down the vessel as moving bed 42. The adduct particles are heated to a suitable decomposition temperature, that is, a temperature within the range of 125 to 200° F., preferably from 130 to 180° F. in such a manner that the adduct is decomposed to yield the adduct-forming compound and urea or thiourea, as the case may be. The liberated adduct-forming compound is withdrawn through line 49 above the decomposition zone encompassing heater 48. The rate of withdrawal is adjusted so that there is an excess of adduct-forming compound in vessel 40 in the immediate vicinity of line 49 which excess will serve as internal reflux to drive any non-adduct forming compound present in this region up the vessel to be removed through line 44. There will be a temperature gradient extending up moving bed 42 in vessel 40 due to the heated liberated adduct-forming compound flowing upwardly from the region of heater 48. Line 49 should be located at such a point that the temperature of the liberated adduct-forming compound will be above that at which it forms an adduct and preferably within the range of 100 to 250° F.

The liberated urea or thiourea passes downwardly from heater 48 and out the lower end of vessel 40. The urea or thiourea can be maintained at a temperature prior to its withdrawal sufficiently high to prevent the formation of an adduct with any adduct-forming compound present in the lower portion of vessel 40; particularly below heater 48. The liberated urea or thiourea will be in a crystalline state and can be withdrawn through line 50 and passed via an elevating means 51 such as a bucket elevator or a gas lift, to centrifuge 52 wherein any adduct-forming compound accompanying the urea or thiourea through line 50 will be removed through line 53. A substantially dry crystalline urea or thiourea can then be passed through line 41 to the top vessel 40 thereby completing the cycle. Suitable activators such as water, menthanol or ethanol can be added through line 54 to activate the urea or thiourea so that adduct formation is promoted. Preferably, sufficient activator is added to merely wet the surface of the urea or thiourea crystals.

If desired and when the adduct-forming compound is vaporizable at a temperature below the melting point of urea or thiourea, as the case may be, heater 48 can be operated so as to supply sufficient heat to the lower portion of vessel 40 to vaporize all of the adduct-forming compound. In this manner, the liberated urea or thiourea will be dried internally of column 40 and centrifuge 52 can be eliminated. The vaporized adduct-forming compound will ascend vessel 40 and be condensed in the region of line 49 by the downflowing and relatively cool adduct particles.

The formation of adducts in column 1 and vessel 40 is an exothermic reaction and results in the liberation of considerable heat which poses the problem of cooling such zone in order to control the temperature maintained therein. Accordingly, there can be provided, as in Figures 1 and 2, an external cooling coil 21 having an inlet 22 and an outlet 23 through which can be passed a cooling medium, such as water, or a refrigerent, such as ammonia; the use of a refrigerant will obviously be necessary whenever the reaction temperature is maintained substantially below that of the surrounding atmosphere. A cooler 25 can also be provided in line 24 of Figure 1 and in line 45 of Figure 2 to cool recycled non-adduct-forming compound in order to aid in the cooling of the adduct forming zone.

Although the concept of this invention is applicable to a process for forming an adduct of any compound capable of forming an adduct with urea or thiourea and to a process for the separation of any compound capable of forming an adduct with urea or thiourea from admixture with a compound not capable of forming such adduct with urea or thiourea, respectively, a general description of the types of compounds which do and do not form adducts will be given in order to better illustrate the applicability of the processes of this invention. In general, an adduct is formed by contacting a straight carbon atom chain organic compound with urea in the presence of an activator-solvent, such as methanol, water or the like. Alternatively, a branched carbon atom chain compound can be contacted with thiourea in the presence of such an activator-solvent to produce an adduct. The straight-chain compound can be admixed with a branched-chain organic compound, the latter of which, in general, do not form adducts with urea. The straight-chain compound can comprise one or more of a normal alkane or alkene hydrocarbon having from 6 to 50 carbon atoms in the molecule such as hexane, the hexenes, heptane, the heptenes, octane, the octenes, nonane, the nonenes, decane, the decenes and progressively higher molecular alkanes and alkenes up to those including 50 carbon atoms. The straight carbon atom chain compound can also be a primary alcohol having from 6 to 50 carbon atoms and being saturated or unsaturated and thus corresponding in carbon atom configuration to the straight-chain hydrocarbons above-mentioned. Urea will also form adducts with such straight carbon atom chain compounds as primary amines having from 8 to 50 carbon atoms per molecule, mercaptans having from 6 to 50 carbon atoms per molecule, ketones having from 6 to 50 carbon atoms per molecule and esters of organic acids having from 6 to 50 carbon atoms per molecule.

Urea does not form adducts with branched carbon atom chain organic compounds nor with cyclic or aromatic organic compounds such as isohexane, methyloctane, cyclohexane, benzene, toluene and cymene. When employing urea in a process of this invention to separate an adduct-forming straight-chain compound from a non-adduct-forming branched-chain or cyclic compound, any one or more of the straight carbon atom organic compounds illustrated above can be admixed with one or more of the non-adduct-forming compounds.

Thiourea forms adducts with branched carbon atom chain organic compounds but does not form adducts with straight carbon atom chain organic compounds nor with aromatic compounds. Thus, adduct-forming power of thiourea is substantially opposite to that of urea in that thiourea forms adducts with branched-chain organic compounds and not with straight-chain organic compounds, while urea forms adducts with the straight-chain organic compounds but not with the branched-chain organic compounds. Thus, thiourea can form adducts with such compounds as the branched carbon atom chain alkane and alkene hydrocarbons having from 5 to 50 carbon atoms in the straight-chain portion of the molecule and from 1 to 20 carbon atoms in a side chain. Illustrative of such compounds are isohexane, ethylhexane, isohexene, isoheptane, isoheptene, ethylheptane, ethycyclooctane, trimethylnonane, cyclohexane, cyclooctane and methylcyclohexane. Thiourea also forms an adduct with a secondary and tertiary alcohol having from 5 to 50 carbon atoms in the straight chain portion of the molecule and from 1 to 20 carbon atoms in the side chain, with a secondary and tertiary amine having at least 7 carbon atoms per molecule, with a mercaptan having from 5 to 50 carbon atoms in the straight chain portion of the molecule and from 1 to 20 carbon atoms in a side chain and with a keytone having from 5 to 50 carbon atoms in the straight chain portion of the molecule and 1 to 20 carbon atoms in the side chain. Thiourea also forms an adduct with various cycloparaffins having at least 6 carbon atoms in the cyclic portion of the molecule and which may or may not contain various side chains containing 1 or more carbon atoms per chain, such as cyclohexane, cycloheptane, cyclooctane, cyclononane, methylcyclohexane, and dimethylcyclooctane. Thiourea can be employed as the adduct-forming material to separate a mixture of one or more compounds which form adducts therewith from one or more compounds which do not form adducts with thiourea.

A more detailed description of the compounds which do or do not form adducts with urea or thiourea can be found in application Serial No. 155,061, filed April 10, 1950, by W. N. Axe and in application Serial No. 155,134, filed April 10, 1950, by Joseph Ackerman and the disclosures contained therein are herein incorporated by reference for a more complete discussion of the compounds capable of forming such adducts.

The conditions employed in column 1 and in vessel 40 and in decomposition zone 9 and in the region of heater 48 (Figure 2) in order to perform the desired functions therein will depend somewhat upon the nature of the feed material, the desired degree of separation and upon numerous other factors. In general, the temperature maintained in column 1 and vessel 40 to induce the formation of an adduct should be within the range of minus 70 to 120° F., preferably from about 0 to 100° F. Obviously, when a temperature below the freezing point of water is employed, water cannot be employed as an activator and, accordingly, another activator, such as methanol or ethanol, should be employed in such instances.

The pressure employed in the adduct-forming regions of column 1 and of vessel 40 should be sufficient to maintain the feed material in a liquid phase therein and, accordingly, will vary with the nature of such feed. Ordinarily, it is preferred to operate at substantially atmospheric pressure when the feed material has a boiling point which will permit operation in a liquid phase at such pressure. Higher pressures must be employed when the boiling point of the feed so demands.

The amount of urea or thiourea employed will depend upon the nature of the adduct to be formed and upon the concentration of the adduct-forming compound in the feed. Ordinarily, the amount of urea or thiourea employed should be within the range of from 2 to 20, preferably from 3 to 6, mols per mol of adduct-forming compound in the feed. The residence time of the urea or thiourea in column 1 and in vessel 40 should be sufficient to insure substantially complete removal of the adduct-forming compound from the feed material. A residence time within the range of 5 minutes to two hours, preferably from 10 to 30 minutes, will be satisfactory. The particle size of the crystalline urea or thiourea should be within the range of 20 to 200, preferably 40 to 80, mesh.

While the invention has been described in connection with present preferred embodiments thereof, it is to be understood that this description is illustrative only and is not intended to limit the invention, the scope of which is defined by the appended claims.

We claim:

1. A process for separating an organic compound capable of forming a solid adduct with an amide selected from the group consisting of urea and thiourea from admixture with an organic compound not capable of forming such adduct which comprises continually moving crystals of said amide aggregated into a column or mass downwardly by gravity flow through an adduct-forming zone, continually feeding said admixture in the liquid phase at an intermediate point into said adduct-forming zone to contact said moving mass of said amide, continually withdrawing said non-adduct-forming compound from the upper portion of said adduct-forming zone, passing an adduct of said amide and said adduct-forming compound to the lower portion of said zone, decomposing said adduct, passing at least a portion of the resultant liberated adduct-forming compound to the lower portion of said zone to act as reflux therein, agitating the upper portion of said zone to prevent the adduct formed therein from bridging across and clogging said zone and recycling sufficient of said withdrawn non-adduct-forming compound to said zone to provide at least a portion of said agitation.

2. A process for separating an organic compound capable of forming a solid adduct with an amide selected from the group consisting of urea and thiourea from admixture with an organic compound not capable of forming such adduct which comprises continually moving crystals of said amide aggregated into a column or mass downwardly by gravity flow through an adduct-forming zone, continually feeding said admixture in the liquid phase at an intermediate point into said adduct-forming zone to contact said moving mass of said amide, continually withdrawing said non-adduct-forming compound from the upper portion of said adduct-forming zone, decomposing an adduct of said amide and said adduct-forming compound, providing at least a portion of the resultant liberated adduct-forming compound as reflux for the lower portion of said zone therein, agitating the upper portion of said zone to prevent the adduct formed therein from bridging across and clogging said zone and recycling sufficient of said withdrawn non-adduct forming compound to said zone to provide at least a portion of said agitation.

3. A process for separating a hydrocarbon capable of forming a solid adduct with an amide selected from the group consisting of urea and thiourea from admixture with a hydrocarbon not capable of forming such adduct which comprises continually moving crystals of said amide aggregated into a column or mass downwardly by gravity flow through an adduct-forming zone, continually feeding said admixture in the liquid phase at an intermediate point into said adduct-forming zone to contact said moving mass of said amide, continually withdrawing said non-adduct-forming compound from the upper portion of said adduct-forming zone, withdrawing an adduct of said amide and said adduct-forming compound from the lower portion of said zone, decomposing said withdrawn adduct, returning at least a portion of the resultant liberated adduct-forming hydrocarbon to the lower portion of said zone to act as reflux therein, agitating the upper portion of said zone to prevent the adduct formed therein from bridging across and clogging said zone and recycling sufficient of said withdrawn non-adduct forming compound to said zone to provide at least a portion of said agitation.

4. In a process wherein a mixture of a straight carbon atom chain compound selected from the class consisting of a straight-chain hydrocarbon having from 6 to fifty carbon atoms per molecule, a primary alcohol having from 6 to 50 carbon atoms per molecule, a primary amine having from 8 to 50 carbon atoms per molecule, a mercaptan having from 6 to 50 carbon atoms per molecule, a ketone having from 6 to 50 carbon atoms per molecule and an ester of an organic acid having from 6 to 50 carbon atoms per molecule and a branched carbon atom chain compound having from 5 to 50 carbon atoms in the straight chain portion of the molecule and from one to 20 carbon atoms in a side chain and selected from the class consisting of alkane and alkene hydrocarbons, secondary and tertiary alcohols, secondary and tertiary amines having at least 7 carbon atoms per molecule, ketones and cycloparaffins having at least 6 carbon atoms per molecule is separated into its component parts by forming a crystalline adduct of one of said compounds of said groups with an amide selected from the group consisting of urea and thiourea, respectively, the process which comprises continually moving particles of said amide downwardly as an aggregate mass by gravity flow through an adduct-forming zone, continually feeding said mixture of compounds into said zone at an intermediate point therein, cooling said zone to maintain it at a temperature within the range of minus 70 to 120° F., withdrawing the non-adduct-forming compound from the upper portion of said zone, withdrawing a resulting adduct of the adduct-forming compound and said amide from the lower portion of said zone, decomposing said withdrawn adduct by heating to a temperature within the range of 125 to 200° F., returning as reflux to the lower portion of said zone an amount of the thus liberated adduct-forming compound within the range of one to six volumes per volume of said liberated compound withdrawn as a product of the process, agitating the downwardly moving mass of amide particles in the upper portion of said zone to an extent sufficient to prevent the adduct formed therein from bridging across and plugging said zone but insufficiently to achieve excessive attrition of said adduct particles, and returning sufficient of said withdrawn non-adduct-forming compound to said zone to provide a space velocity therein within the range of 2 to 30 volumes of non-adduct-forming compound per volume of amide per hour.

5. A process for separating a straight carbon atom chain hydrocarbon having from six to fifty carbon atoms per molecule from admixture with a branched carbon atom chain hydrocarbon having from five to fifty carbon atoms in the straight chain portion of the molecule and having a side chain containing from one to twenty carbon atoms which comprises continually moving particles of a crystalline amide selected from the group consisting of urea and thiourea downwardly as an aggregate mass by gravity flow through an adduct-forming zone, continually feeding said admixture of hydrocarbons into said zone at an intermediate point therein, cooling said zone to maintain it at an adduct-forming temperature, withdrawing a non-adduct-forming hydrocarbon from the upper portion of said zone, withdrawing a resulting adduct of said adduct-forming hydrocarbon and said amide from the lower portion of said zone, decomposing said withdrawn adduct by heating, returning a portion of the thus liberated adduct-forming compounds to the lower portion of said zone to act as reflux therein, agitating the downwardly moving mass of amide particles in the upper portion of said zone to an extent sufficient to prevent the adduct formed therein from bridging across and plugging said zone but insufficiently to achieve excessive attrition of said adduct particles, and returning sufficient of said withdrawn non-adduct-forming hydrocarbon to said zone to provide at least a portion of said agitation.

6. A process for separating a straight carbon atom chain hydrocarbon having from six to fifty carbon atoms per molecule from admixture with a branched carbon atom chain hydrocarbon having from five to fifty carbon atoms in the straight chain portion of the molecule and having a side chain containing from one to twenty carbon atoms which comprises continually moving particles of a crystalline amide selected from the group consisting of urea and thiourea downwardly as an aggregate mass by gravity flow through an adduct-forming zone, continually feeding said admixture of hydrocarbons into said zone at an intermediate point therein at such a rate that the mol ratio of said amide to the adduct-forming hydrocarbon is within the range of 1:1 to 10:1, cooling said zone to maintain it at a temperature within the range of minus 70 to 120° F., withdrawing a non-adduct-forming hydrocarbon from the upper portion of said zone, withdrawing a resulting adduct of said adduct-forming hydrocarbon and said amide from the lower portion of said zone, decomposing said withdrawn adduct by heating to a temperature within the range of 125 to 200° F., returning as reflux to the lower portion of said zone an amount of the thus liberated adduct-forming hydrocarbon within the range of one to six volumes per volume of said liberated hydrocarbon withdrawn as a product of the process, agitating the downwardly moving mass of amide particles in the upper portion of said zone to an extent sufficient to prevent the adduct formed therein from bridging across and plugging said zone but insufficiently to achieve excessive attrition of said adduct particles, and returning sufficient of said withdrawn non-adduct-forming hydrocarbon to said zone to provide a space velocity therein within the range of 2 to 30 volumes of non-adduct-forming hydrocarbon per volume of amide per hour.

7. A process for separating an organic compound capable of forming a solid adduct with an amide selected from the group consisting of urea and thiourea from admixture with an organic compound not capable of forming such an adduct which comprises continually moving particles of said amide selected from the group consisting of urea and thiourea downwardly as an aggregate mass by gravity flow through an adduct-forming zone, continually feeding said admixture of compounds into said zone, cooling the upper portion of said zone, withdrawing a non-adduct forming compound from the upper portion of said zone, heating the lower portion of said zone to decompose the adduct formed in the upper cooled portion of said zone to yield said adduct-forming compound and said amide, maintaining sufficient of said adduct-forming compound in said zone immediately above said heated portion to act as internal reflux and to prevent non-adduct-forming compound from entering said heated zone, and returning sufficient of said withdrawn non-adduct-forming compound to said cooled zone to provide hydraulic agitation thereof to prevent adduct particles being formed therein from bridging across and clogging said zone.

8. A process for separating a straight carbon atom chain hydrocarbon having at least six carbon atoms per molecule and having a boiling point below the melting point of an amide selected from the group consisting of urea and thiourea from admixture with a branched carbon atom chain hydrocarbon having at least five carbon atoms in the straight chain portion of the molecule and having a side chain containing at least one carbon atom and having a boiling point below the melting point of said amide, which comprises continually moving particles of said amide downwardly as an aggregate mass by gravity flow through an adduct-forming zone, continually feeding said admixture by hydrocarbons into said zone at an intermediate point therein, cooling the upper portion of said zone to a temperature suitable for the formation of an adduct between said adduct-forming hydrocarbon and said amide, withdrawing a non-adduct-forming hydrocarbon from the upper portion of said zone, heating the lower portion of said zone at a temperature sufficient to decompose said adduct and to vaporize the resulting liberated adduct-forming hydrocarbon, withdrawing the liberated amide, withdrawing the liberated hydrocarbon from said zone at such a rate as to maintain sufficient adduct-forming hydrocarbon in said zone immediately above said heated portion to act as internal reflux and to prevent any non-adduct-forming hydrocarbon from entering said heated zone, and returning sufficient of said withdrawn non-adduct-forming hydrocarbon to said cooling zone to provide hydraulic agitation thereof to prevent the adduct being formed in said cooled zone from bridging across and clogging said cooled zone.

9. A process for separating an organic compound capable of forming a solid adduct with an amide selected from the class consisting of urea and thiourea from admixture with an organic compound not capable of forming an adduct which comprises continually moving particles of said amide downwardly as an aggregate mass by gravity flow through an adduct-forming zone, continually feeding said admixture of compounds into said zone at an intermediate point therein, cooling the upper portion of said zone to a temperature within the range of minus 70 to 120° F., withdrawing a non-adduct-forming compound from the upper portion of said zone, heating the lower portion of said zone at a temperature within the range of 125 to 200° F. whereby the adduct formed in the upper cooled portion of said zone is decomposed in said heated zone to yield said adduct-forming compound and said amide, withdrawing the liberated amide, withdrawing the liberated compound from said heated portion of said zone at such a rate as to maintain sufficient adduct-forming compound in said zone immediately above said heated portion to act as internal reflux and to prevent said non-adduct-forming compound from entering said heated zone, agitating said mass of amide in said cooling zone to prevent bridging across and clogging of said cooling zone and returning sufficient of said withdrawn non-adduct forming compound to said cooling zone to provide at least a portion of said agitation.

10. A process for separating a straight carbon atom chain hydrocarbon having from six to fifty carbon atoms per molecule from admixture with a branched carbon atom chain hydrocarbon having from five to fifty carbon atoms in the straight chain portion of the molecule and having a side chain containing from one to twenty carbon atoms which comprises continually moving particles of a crystalline amide selected from the group consisting of urea and thiourea downwardly as an aggregate mass by gravity flow through an adduct-forming zone, continually feeding said admixture of hydrocarbons into said zone at an intermediate point therein at such a rate that the mol ratio of said amide to the adduct-forming hydrocarbon is within the range of 1:1 to 10:1, cooling the upper portion of said zone to a temperature within the range of minus 70 to 120° F., withdrawing a non-adduct forming hydrocarbon from the upper portion of said zone, heating the lower portion of said zone at a temperature within the range of 125 to 200° F. whereby the adduct formed in the upper cooled portion of said zone is decomposed in said heated zone to yield said adduct-forming hydrocarbon and said amide, withdrawing the liberated amide, withdrawing the liberated hydrocarbon from said heated portion of said zone at such a rate as to maintain sufficient adduct-forming hydrocarbon in said zone immediately above said heated portion to act as internal reflux and to prevent any non-adduct-forming hydrocarbon from entering said heated zone, agitating said mass of amide in said cooling zone to prevent bridging across and clogging of said cooling zone and returning sufficient of said withdrawn non-adduct-forming hydrocarbon to said cooling zone to provide a space velocity therein within the range of 2 to 30 volumes of non-adduct-forming hydrocarbon per volume of amide per hour.

11. A process for separating an organic compound capable of forming a solid adduct with an amide selected from the group consisting of urea and thiourea from admixture with an organic compound not capable of forming such adduct which comprises continually moving crystals of said amide aggregated into a column or mass downwardly by gravity flow through an adduct-forming zone, continually feeding said admixture in the liquid phase at an intermediate point into said adduct-forming zone to contact said moving mass of said amide, continually withdrawing said non-adduct-forming compound from the upper portion of said adduct-forming zone, passing an adduct of said amide and said adduct-forming compound to the lower portion of said zone, decomposing said adduct, passing at least a portion of the resultant liberated adduct-forming compound to the lower portion of said zone to act as reflux therein, agitating the upper portion of said zone to prevent the adduct formed therein from bridging across and clogging said zone and maintaining sufficient of a non-adduct-forming compound in said zone to provide at least a portion of said agitation.

12. A process for separating an organic compound capable of forming a solid adduct with an amide selected from the group consisting of urea and thiourea from admixture with an organic compound not capable of forming such adduct which comprises continually moving crystals of said amide aggregated into a column or mass downwardly by gravity flow through an adduct-forming zone, continually feeding said admixture in the liquid phase at an intermediate point into said adduct-forming zone to contact said moving mass of said amide, continually withdrawing said non-adduct-forming compound from the upper portion of said adduct-forming zone, decomposing an adduct of said amide and said adduct-forming compound, providing at least a portion of the resultant liberated adduct-forming compound as reflux for the lower portion of said zone therein, and agitating the upper portion of said zone to prevent the adduct formed therein from bridging across and clogging said zone.

13. A process for separating a straight carbon atom chain hydrocarbon having from six to fifty carbon atoms per molecule from admixture with a branched carbon atom chain hydrocarbon having from five to fifty carbon atoms in the straight chain portion of the molecule and having a side chain containing from one to twenty carbon atoms which comprises continually moving particles of a crystalline amide selected from the group consisting of urea and thiourea downwardly as an aggregate mass by gravity flow through an adduct-forming zone, continually feeding said admixture of hydrocarbons into said zone at an intermediate point therein at such a rate that the mol ratio of said amide to the adduct-forming hydrocarbon is within the range of 1:1 to 10:1, cooling said zone to maintain it at a temperature within the range of minus 70 to 120° F., withdrawing a non-adduct-forming hydrocarbon from the upper portion of said zone, withdrawing a resulting adduct of said adduct-forming hydrocarbon and said amide from the lower portion of said zone, decomposing said withdrawn adduct by heating to a temperature within the range of 125 to 200° F., returning as reflux to the lower portion of said zone an amount of the thus liberated adduct-forming hydrocarbon within the range of one to six volumes per volume of said liberated hydrocarbon withdrawn as a product of the process, and agitating the downwardly moving mass of amide particles in the upper portion of said zone to an extent sufficient to prevent the adduct formed therein from bridging across and plugging said zone but insufficiently to achieve excessive attrition of said adduct particles.

14. The process of claim 12 in which an inert non-absorbent, inorganic solid material having a particle size within the range of 6 to 100 mesh is added to said amide in an amount of from 0.1 to 2.0 pounds per pound of said amide.

15. The process of claim 12 in which an inert non-absorbent inorganic solid material having a particle size within the range of 12 to 20 mesh is added to said amide in an amount of from 0.2 to 1.0 pound per pound of said amide.

16. The process of claim 15 in which said inorganic solid material is selected from the group consisting of alumina, silica, and bauxite.

References Cited in the file of this patent

UNITED STATES PATENTS

| Number | Name | Date |
|---|---|---|
| 1,303,333 | Lambert | May 13, 1919 |
| 1,602,060 | White | Oct. 5, 1926 |
| 2,265,837 | Harding | Dec. 9, 1941 |
| 2,386,366 | Storment | Oct. 9, 1945 |
| 2,395,959 | Soday | Mar. 5, 1946 |
| 2,499,820 | Fetterly | Mar. 7, 1950 |
| 2,518,677 | Garner et al. | Aug. 15, 1950 |
| 2,520,716 | Fetterly | Aug. 29, 1950 |
| 2,540,977 | Arnold | Feb. 6, 1951 |

FOREIGN PATENTS

| Number | Country | Date |
|---|---|---|
| 17,339/47 | Australia | Apr. 16, 1948 |